May 6, 1924.
A. A. BACKHAUS
1,493,183
PROCESS OF PURIFYING CARBON DIOXIDE
Filed May 7, 1919
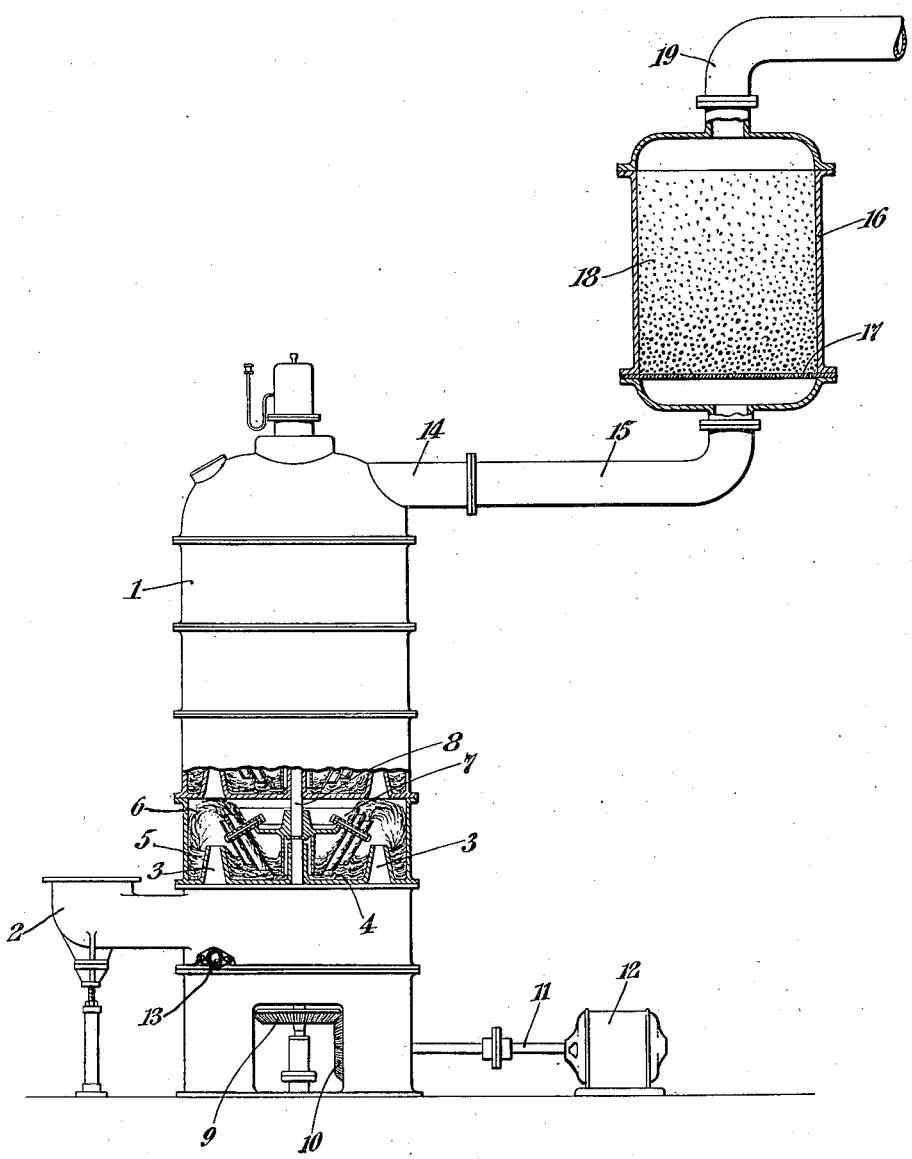

Patented May 6, 1924.

1,493,183

UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

PROCESS OF PURIFYING CARBON DIOXIDE.

Application filed May 7, 1919. Serial No. 295,472.

*To all whom it may concern:*

Be it known that I, ARTHUR A. BACKHAUS, a citizen of the United States, residing at Baltimore, State of Maryland, have invented a certain new and useful Improvement in Processes of Purifying Carbon Dioxide, of which the following is a specification.

My invention relates particularly to a process for purifying carbon dioxide so that it will be suitable for many different commercial uses.

The object of my invention is to provide a process by means of which carbon dioxide, and especially the carbon dioxide obtained as a by-product in the commercial production of alcohol, may be purified so that the carbon dioxide will be suitable for use in carbonating beverages and also for refrigeration purposes.

Another object of my invention is to remove the odorous constituents of carbon dioxide so that the carbon dioxide can be used in the manufacture of beverages without contamination of the same and without making the said beverages distasteful by the presence of such impurities.

Another object is to remove the aldehydes present so that the carbon dioxide will be suitable for refrigeration purposes owing to the fact that corrosive action due to the presence of the aldehydes is eliminated.

Further objects will appear from the detailed description contained hereinafter.

While my invention is capable of being carried out in many different ways for the purpose of illustration I shall describe only one way of carrying out the same hereinafter and while it is capable of being carried out in connection with many different types of apparatus, I have shown only one type of apparatus for use in connection therewith in the accompanying drawing in which:

The figure is a diagrammatic representation of an apparatus which may be used in connection with my invention.

For example, in carrying out my invention the carbon dioxide which is to be treated in accordance with my invention may be produced in the fermentation of any of the many different materials which are fermented to produce alcohol, as for example, molasses, grains of all kinds, potatoes, etc. and it may contain a number of different impurities including a small percentage of alcohol, a number of odorous constituents, the chemical constitution of which is not completely known, but which comprises probably nitrogen compounds, essential oils, aldehydes and traces of fusel oil. The carbon dioxide thus obtained is first passed through a scrubber 1 to remove the alcohol with which the carbon dioxide is saturated. This scrubber may be of any desired type, but as shown in the drawing, comprises an inlet pipe 2 adapted to deliver the carbon dioxide through a plurality of tubes 3 to a series of pans 4 carrying a body of water 5 which is formed into an annular spray 6 over each of the pans and over the tubes 3 in said pans by means of inverted frusto-conical members 7 carried upon a shaft 8 rotated by bevel gears 9 and 10 from a driving shaft 11 driven by an electric motor 12. The diluted alcohol contained in the scrubber 1 is conveyed away by a pipe 13 and may be returned to the inlet end of the still used for removing the alcohol from the fermented materials while the carbon dioxide freed from the alcohol passes out by the gas outlet 14. From this point the carbon dioxide is, in the embodiment shown, conveyed by a pipe 15 to an absorbing chamber 16 having a perforated plate 17 in the bottom thereof to support a body of carbon 18. The carbon used for this purpose may be any absorptive carbon or charcoal adapted to absorb the odorous impurities in the carbon dioxide but is preferably cocoanut shell carbon or the carbon produced by carbonizing the shells or pits of many other kinds of nuts. The body of carbon 18 removes from the carbon dioxide the odorous constituents and in this way the nitrogen compounds, essential oils, fusel oil, etc., as well as the aldehydes which give an odorous character to the carbon dioxide and which, if present, are unsuited for use in carbonating beverages and for refrigeration purposes, are removed. From this point the carbon dioxide passes out of the absorbing chamber by means of a pipe 19, by which it may be conducted to any suitable point for use in any desired way, as for example, by storage in a gas holder or liquefaction in cylinders in order to use the same in carbonating beverages of various kinds or for refrigeration.

In order to revivify the carbon it may be removed and heated in the absence of air to a temperature of 600 to 700° C.

It will be understood that in the treatment above described for removing the alcohol and other odorous constituents which are at least partially pleasant smelling and pleasant tasting, if desired, the alcohol and other odorous constituents may be removed only in part so that, where this is found desirable, the carbon dioxide may carry the residual quantities of these foreign substances.

While I have described my invention above in detail I wish it to be understood that many changes may be made therein without departing from the spirit of the same.

I claim:

1. The process which comprises purifying carbon dioxide obtained from fermentation in the production of alcohol by scrubbing it and then passing it through carbon produced by carbonizing shells or pits of nuts, to remove impurities not absorbed by the water.

2. The process which comprises purifying carbon dioxide obtained from fermentation in the production of alcohol by scrubbing it and then passing it through cocoanut shell carbon, to remove impurities not absorbed by the water.

3. The process which comprises purifying carbon dioxide obtained from fermentation in the production of alcohol, by passing it through cocoanut shell carbon.

In testimony that I claim the foregoing, I have hereunto set my hand this 11 day of April, 1919.

ARTHUR A. BACKHAUS.